A. ZABAWA.
AUTOMOBILE AND STREET CAR FENDER.
APPLICATION FILED JULY 20, 1918.
1,285,880.
Patented Nov. 26, 1918.
2 SHEETS—SHEET 2.
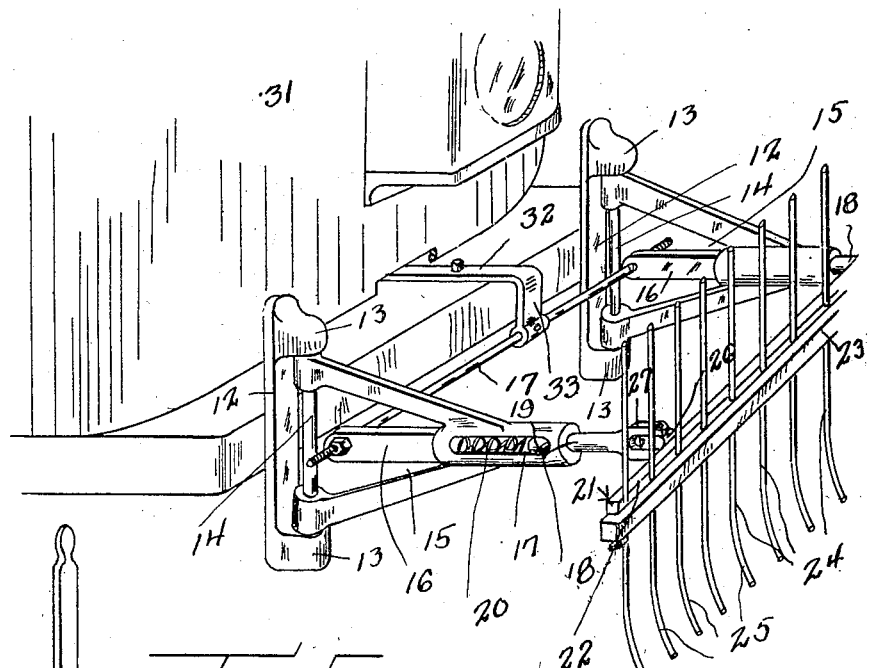
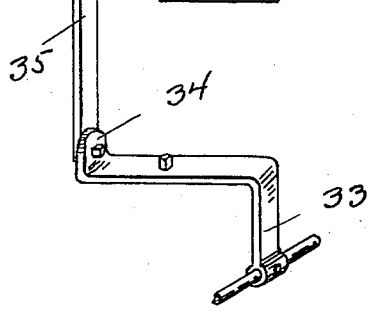
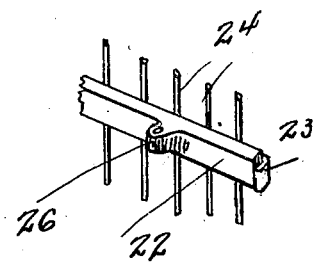
INVENTOR
Andrzej Zabawa.
By *Omar Gain*
his ATTORNEY

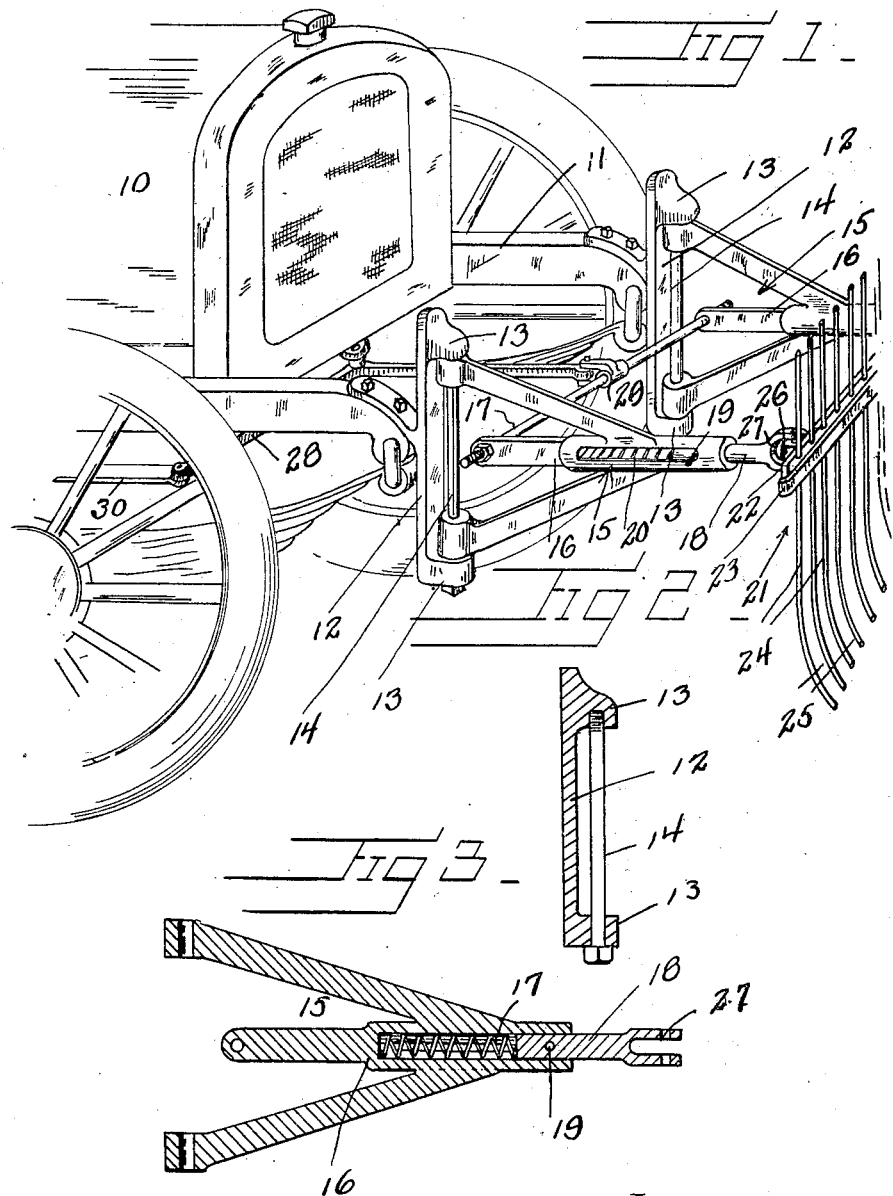

UNITED STATES PATENT OFFICE.

ANDRZEJ ZABAWA, OF SHAWINGAN FALLS, QUEBEC, CANADA.

AUTOMOBILE AND STREET-CAR FENDER.

1,285,880.  Specification of Letters Patent.  Patented Nov. 26, 1918.

Application filed July 20, 1918. Serial No. 245,805.

*To all whom it may concern:*

Be it known that I, ANDRZEJ ZABAWA, a citizen of Poland, residing at Shawingan Falls, Province of Quebec, Dominion of Canada, have invented certain new and useful Improvements in Automobile and Street-Car Fenders, of which the following is a specification.

The present invention relates to new and useful improvements in fenders and more particularly to that class adapted for use on automobiles, street railways and the like.

The primary object of the invention is the provision of a fender which can be readily attached to an automobile, street car, or the like, and which can be swung laterally toward off persons or foreign objects at either side thereof.

Another object of the invention is the provision of means for movably mounting a fender, and means for actuating the same.

A further object of the invention is the provision of a fender such as above described, which will be comparatively simple and inexpensive to manufacture, reliable and efficient in use, and readily operated.

With the above and other objects in view the present invention resides in the novel features of construction, formations, combinations and arrangements of parts to be hereinafter more fully described, claimed, and illustrated in the accompanying drawings forming a part of the present application and in which:

Figure 1 is a perspective view of the fender applied to the front of an automobile.

Fig. 2 is a detail sectional view taken through one of the supporting brackets.

Fig. 3 is a similar view taken through one of the supporting arms.

Fig. 4 is a perspective view showing the fender applied to a street car.

Fig. 5 is a detail view of the operating lever for use in the device disclosed in Fig. 4.

Fig. 6 is a detail perspective view of a portion of a fender looking at the rear side thereof.

Referring now to the accompanying drawings by corresponding characters of reference throughout the several views, and especially to the form shown in Fig. 1, the numeral 10 designates in general an automobile including the chassis 11 to the forward end of which is bolted a pair of brackets 12 terminally equipped with bearings 13 in which are held vertically disposed rods 14 on which are journaled supporting arms 15 designed to swing in a horizontal plane. The arms 15 each include central body members 16, the inner ends of which are connected by a transverse rod 17.

The body 16 of each arm 15 is provided with a central channel 17. Plungers 18 are mounted in the hollow body 16 for sliding movement, being held against displacement by a pin 19 and normally forced outwardly by the springs 20.

The fender 21 is supported by the plungers 18 and consists of a pair of bars 22 and 23 between which is clamped a series of spaced vertically disposed rods 24 having the lower ends curved slightly as shown at 25.

The bar 22 has two lugs 26 extending rearwardly therefrom which are pivoted between the forked ends 27 of the plungers 18.

A bell-crank lever 28 is pivoted to the under side of the automobile and is swiveled at 29 to the rod 17.

A rod 30 connects the opposite end of the bell crank to a suitable mechanism (not shown) within convenient reach of the driver's seat, by means of which the fender can be operated on one side or the other to ward off persons or foreign objects.

Referring now more particularly to Figs. 4 and 5 of the drawing, the fender is applied to a street car 31 and the rods 17 instead of being connected to the bell-crank lever 28 as in Fig. 1, is connected to a flat lever 32 the forward end of which is bent downwardly at 33 while the opposite end thereof is bent upwardly at 34 and pivotally connected to an operating lever 35, mounted within the street car within the convenience of the motorman.

Obviously upon the movement of this lever 35 in opposite directions the fender will be moved transversely of the car for the purposes previously explained in connection with Fig. 1.

From the foregoing description, taken in connection with the accompanying drawings, it will be manifest that a fender is provided for street cars, automobiles and the like, which will fulfil all of the necessary requirements of such a device, and it should be understood in this connection, that various minor changes in the specific details of construction can be resorted to within the scope of the appended claims without departing from the spirit or sacrificing any of the advantages of the invention.

Having thus fully described the invention, what I claim as new and desire to protect by Letters Patent is:—

1. In a device such as described, the combination with a supporting device, of brackets secured thereto, arms pivotally connected to the brackets, a connecting rod secured to the inner ends of the arms, plungers carried by the arms, a fender pivotally connected to said plungers and an operating means connected to the rod for moving the fender laterally.

2. In a device of the character described, the combination with a vehicle or the like, brackets secured to the opposite sides thereof, arms pivotally connected to said bracket, said arms including hollow body portions, spring-pressed plungers mounted in said hollow body portion, a fender pivoted to the forward ends of said plungers, a rod connecting the inner ends of the body portions of said arms and an operating mechanism attached to said rod.

In testimony whereof I have affixed my signature.

ANDRZEJ ZABAWA.